N. STATHAM.
LIGHT PRECIPITATED CHALK AND PROCESS OF MAKING THE SAME.
APPLICATION FILED DEC. 23, 1915.
1,178,962.
Patented Apr. 11, 1916.
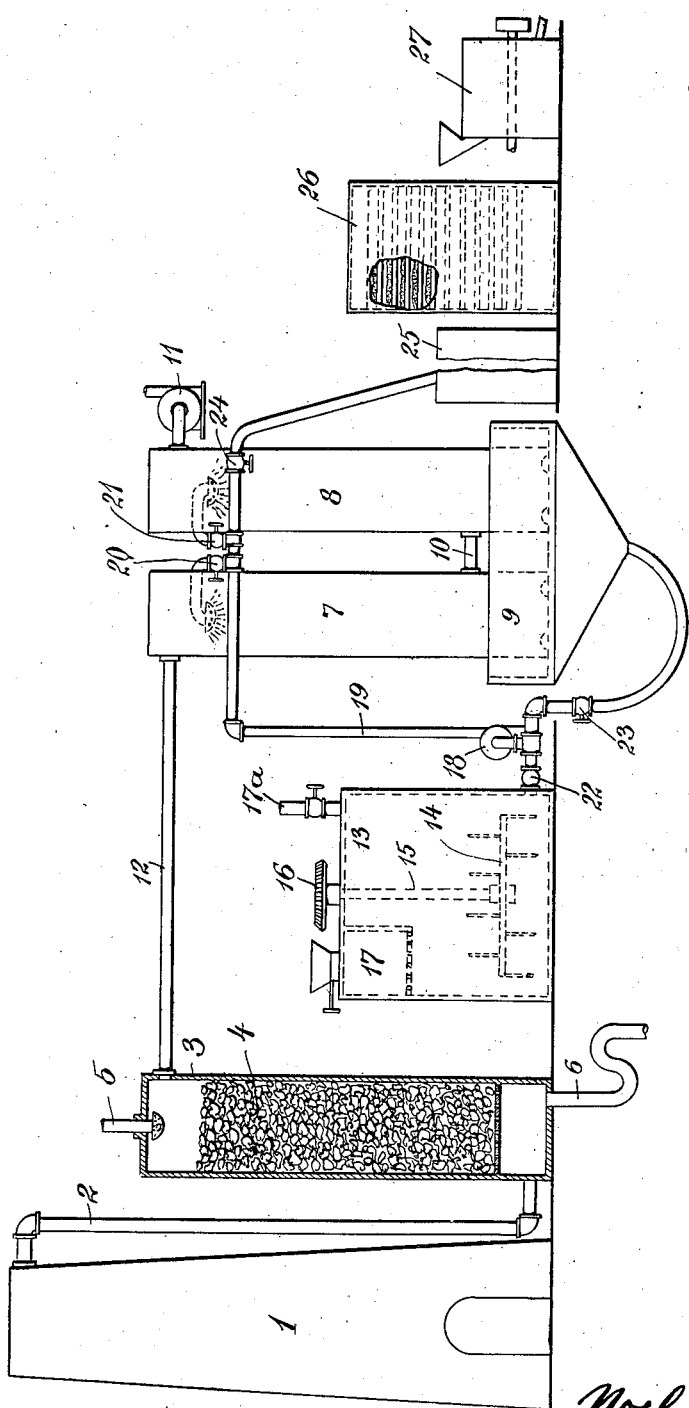
Inventor
Noel Statham
By his Attorney
Harry L. Duncan

UNITED STATES PATENT OFFICE.

NOEL STATHAM, OF BOONTON, NEW JERSEY, ASSIGNOR TO INDUSTRIAL CHEMICAL COMPANY, OF NEW YORK, N. Y., A CORPORATION OF NEW YORK.

LIGHT PRECIPITATED CHALK AND PROCESS OF MAKING THE SAME.

1,178,962.     Specification of Letters Patent.     Patented Apr. 11, 1916.

Application filed December 23, 1915. Serial No. 68,313.

*To all whom it may concern:*

Be it known that I, NOEL STATHAM, a subject of the King of Great Britain, formerly residing at Yonkers, Westchester county, New York, and now residing at Boonton, Morris county, New Jersey, have made a certain new and useful Invention Relating to Light Precipitated Chalk and Processes of Making the Same, of which the following is a specification, taken in connection with the accompanying drawing, which forms part of the same.

The invention described in this application, which is in part a continuation of my copending application originally filed August 22, 1912, as Serial No. 716,498, relates to processes of making a light precipitated chalk which, so far as I know, is lighter than any heretofore produced, and which may weigh less than seventeen pounds per cubic foot.

The object of my invention is to produce an extremely light precipitated chalk, and to do so by a method and means which are relatively simple and inexpensive. There is at the present time a large demand for very light precipitated chalk. For one reason or another the weight of a unit volume of chalks precipitated by different processes varies greatly. The lightest chalk heretofore commercially available has weighed about 18.3 lbs. per cubic foot. Another chalk on the market has a weight of about 28.3 lbs. per cubic foot; and still other precipitated chalks have still greater weight per cubic foot. For many purposes the heavier grades of chalk will not be accepted at all; and the lighter the chalk the greater, in general, is its value. By the process herein described, I am able to make precipitated chalk or finely divided calcium carbonate having a weight of about 16.2 lbs. per cubic foot; this being so far as I know, the lightest chalk yet made.

I will now proceed to describe my process for making light precipitated chalk with reference to the accompanying drawing which illustrates more or less diagrammatically one form of apparatus for carrying out my process.

In the said drawing 1 designates a lime kiln. This kiln may be of ordinary construction, and I do not limit myself to any particular type of kiln or to any particular fuel to be used therein.

2 designates a pipe which conducts the resulting kiln gases, which consist mainly of carbon-dioxid and nitrogen, to the bottom of a suitable washer 3. This washer contains, by preference, a body of coke or limestone 4 by which sulfurous gases are removed from these kiln gases; the washer being provided with water supply means 5, which causes water to percolate down through the limestone or coke 4 and past or through the ascending kiln gases. The water percolating down through the washer passes off through a suitable discharge 6.

7 and 8 designate carbonating towers connected at their lower ends to a collecting tank 9, and also connected near their lower ends by a pipe connection 10.

11 designates a suction fan or other equivalent exhauster by which suction is produced in these carbonating towers 7 and 8, and 12 designates a pipe whereby the washed kiln gases are conveyed from the washer 3 to the top of the first carbonating tower, 7.

13 designates a suitable lime hydrator. The particular construction of hydrator shown is only one of many which may be used, comprising a tank having within it an agitator 14 arranged to be driven by a shaft 15 and gear 16, said tank being also provided with a perforated lime basket 17. It will be understood that water admitted to this hydrator at some suitable point $17^a$ and contacting with the lime in the basket 17, slakes the lime which may be produced in the kiln 1; and the agitation of the mixture of slaked lime and water produced by the rotation of agitator 14, produces milk of lime which may be of about 1.05 specific gravity, or 10° Twaddell.

18 designates a suitable pump by means of which this lime liquor is pumped up to the upper portions of the carbonating towers 7 and 8, and delivered therein through a pipe 19 and valves 20 and 21 to a suitable spraying device, and thence showered or projected down through the gases in these towers. The pump 18 is provided with valves 22 and 23 whereby it may draw lime liquor from either the hydrator 13 or the tank 9, or from both said hydrator and said tank. A valve 24 is further provided in pipe 19 whereby when carbonation has proceeded sufficiently, the contents of tank 9 may be discharged by pump 18 into a suitable filter 25. I do not limit myself to any particular type of filter, but a vacuum filter is convenient. In this filter the precipitated chalk is freed from a considerable portion of its moisture and then the chalk is removed from the filter, and may be dried in a suitable tray drying oven 26 (the particular construction of which is unnecessary to describe or illustrate in detail as such driers are well known). The moist precipitated chalk from the filter which may contain some forty per cent. of moisture may be placed on the drier trays or shelves in layers 4 to 6 inches or so thick, so that it may be heated and dried in this or any other suitable type of drier without substantial agitation which seems to be of considerable importance in promoting or retaining the light desirable quality of the finished material. After being dried in about 24 hours or so the material may be reduced to a fine powder in a suitable disintegrator, not shown, and then the material may be sieved in a suitable bolting machine 27.

In producing the lime solution in hydrator 13, the caustic lime, after it has been slaked, is mixed to a thin cream with water and may be purified by screening or floating, or in any other suitable manner, so as to free it from all undesirable insoluble foreign matter and produce a very finely divided hydrated lime liquor.

It will be seen that in producing the precipitated chalk or calcium carbonate, the lime liquor is circulated from the tank through the pump 18 and pipe 19 to the spraying device at or near the tops of towers 7 and 8, and is sprayed or disseminated and showered or allowed a considerable free flight or fall down through said towers. In this way for example the desired relative movement may be secured between the carbonating atmosphere and the separated drops or disseminated particles of lime liquor which are projected so as to have a free flight or fall through such a carbonating tower or open chamber having a height of fifteen to twenty-five feet or more, this rapid projection through an atmosphere containing carbon-dioxid apparently promoting the formation of such light precipitated chalk possibly because of the rapid frictional renewal of the active surface of the particles of lime liquor on which this precipitating action takes place; and lime liquor may of course be sprayed or otherwise rapidly projected for considerable distances such as several feet or more for instance through suitable carbonating chambers in other directions than vertically downward therein. It will also be seen that the lime liquor, as so showered down through said towers, passes through an atmosphere rich in carbon-dioxid, which atmosphere the fan 11 draws from the top of the scrubber or washer 3 through the pipe 12 and towers 7 and 8 and connection 10. The conditions obtaining within towers 7 and 8 are therefore extremely favorable for the formation of carbonate of lime of almost molecular fineness, and since the liquid in tank 9 is in constant circulation, the carbonate of lime precipitated in said tank has no opportunity to form grains of appreciable size. The filtering and drying of the carbonate of lime of necessity results in the production of lumps or cakes of some size; yet, because of the extreme fineness of the individual particles which compose such lumps or cakes, they break up in the disintegrator, into an extremely light and fluffy powder, the several grains of which are extremely minute. The carbonation is usually conducted in these carbonating towers until substantially all of the calcium hydrate in the lime liquor has been carbonated, and a non-alkaline liquor is obtained consisting of very finely divided calcium carbonate in suspension in water. During this operation, a small proportion of ammonia is sometimes added to the liquor, this ammonia causing any magnesium oxid or carbonate which may be present as an impurity to be taken into solution and removed if desired.

This invention has been described in connection with a number of illustrative forms of apparatus, parts, proportions, ingredients, concentrations, duration, nature and order of steps, to the details of which disclosure the invention is not of course to be limited, since

What is claimed as new and what is desired to be secured by Letters Patent is set forth in the appended claims.

1. The process of producing precipitated chalk which comprises calcining calcareous material and producing lime and gases rich in carbon-dioxid, washing the resulting gases and thereby freeing them from impurities, hydrating the lime produced and forming hydrated lime liquor, showering such liquor through the purified gases resulting from the lime-forming reaction and thereby effecting combination of the carbon-dioxid of such gases with the calcium hydrate of the liquor, collecting the liquor which has passed through such carbon-dioxid atmosphere and reshowering it through an atmosphere rich in carbon-dioxid, and collecting the resulting precipitated chalk.

2. The process of producing light finely divided chalk which comprises spraying hydrated lime liquor and effecting its free fall through an atmosphere rich in carbon-dioxid to effect a partial conversion of the lime into chalk and continuing such spraying of the resulting chalk-containing lime liquor to effect a further conversion of the lime into chalk, the liquor being maintained in constant circulation throughout the process, whereby the chalk formed is kept in suspension in a finely divided form, and the formation of compact lumps is prevented.

3. The process of producing precipitated chalk which comprises hydrating lime and purifying the resulting lime liquor and freeing it from insoluble foreign matter, spraying the lime liquor and effecting its free fall through an atmosphere of gas rich in carbon-dioxid and collecting the precipitated chalk thus obtained and substantially freeing from water and drying the same.

4. The process of producing light precipitated chalk which comprises disseminating hydrated lime liquor and effecting its free fall in disseminated condition through an atmosphere of gas rich in carbon-dioxid and collecting, drying and disintegrating the precipitated chalk thus obtained.

5. The process of producing light precipitated chalk which comprises repeatedly disseminating and projecting hydrated lime liquor for considerable distances through an atmosphere of gas rich in carbon-dioxid, and collecting the precipitated chalk thus obtained.

6. The process of producing light finely divided chalk which comprises projecting hydrated lime liquor for a number of feet in disseminated condition through an atmosphere rich in carbon-dioxid whereby the chalk formed is kept in suspension in the liquor in a finely divided form, and the formation of compact grains or lumps is prevented.

7. The process of producing light precipitated chalk which comprises disseminating hydrated lime liquor and effecting its rapid relative movement in disseminated condition through an atmosphere of gas containing considerable carbon-dioxid, and collecting the precipitated chalk thus obtained.

8. The process of producing light precipitated chalk which comprises disseminating hydrated lime liquor and effecting its rapid relative movement in disseminated condition through an atmosphere of gas containing considerable carbon-dioxid and in collecting and largely freeing the formed chalk from water and drying the same without substantial agitation.

9. The light precipitated chalk consisting substantially of finely divided calcium carbonate and having, in the dry state, a weight not greater than seventeen pounds per cubic foot.

10. The light precipitated chalk consisting of pulverulent calcium carbonate and having, in the dry state, a weight of approximately 16.2 pounds per cubic foot.

NOEL STATHAM.

Witnesses:
BERNARD N. GLICK,
J. R. CONDIT.